United States Patent Office 3,837,975
Patented Sept. 24, 1974

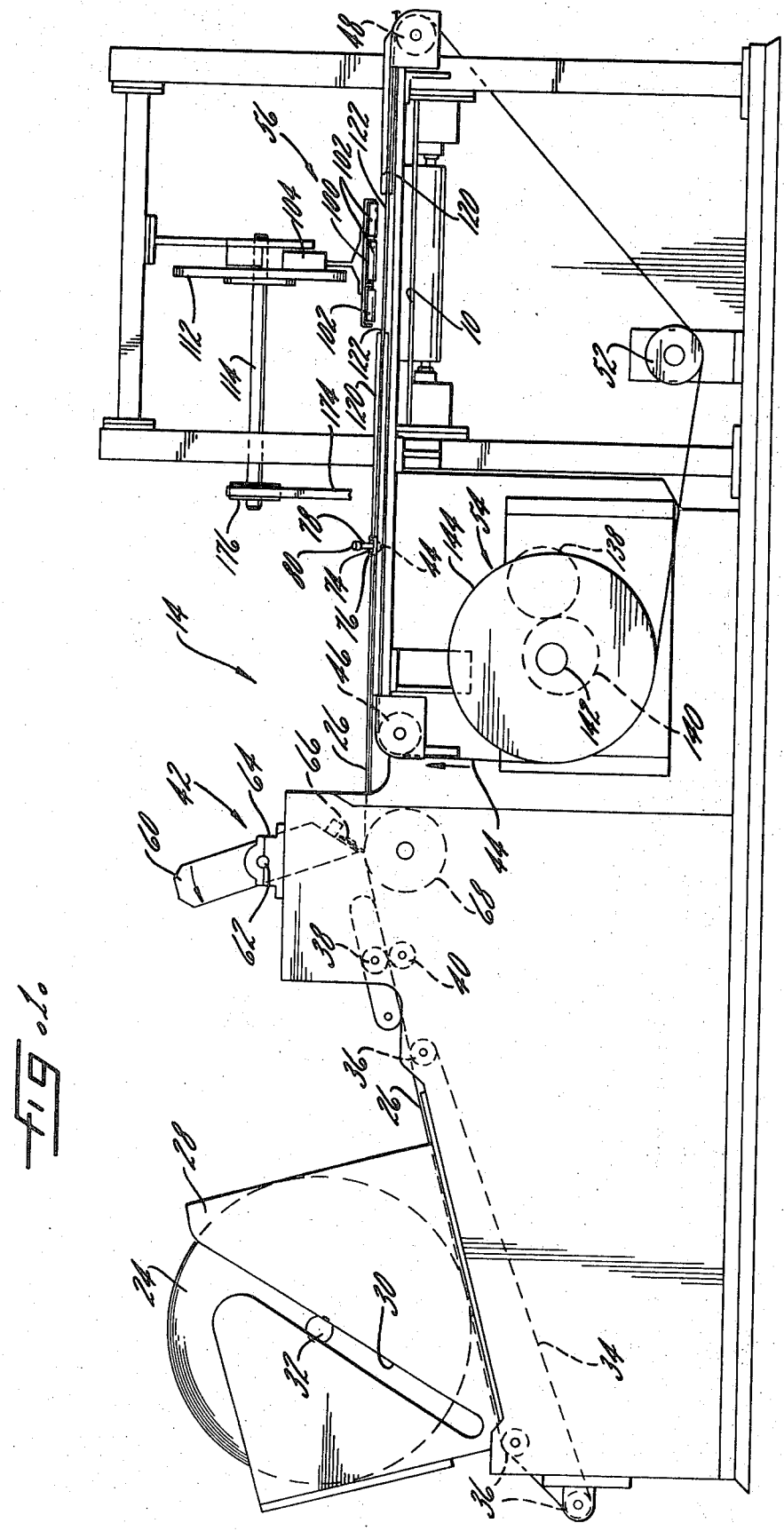

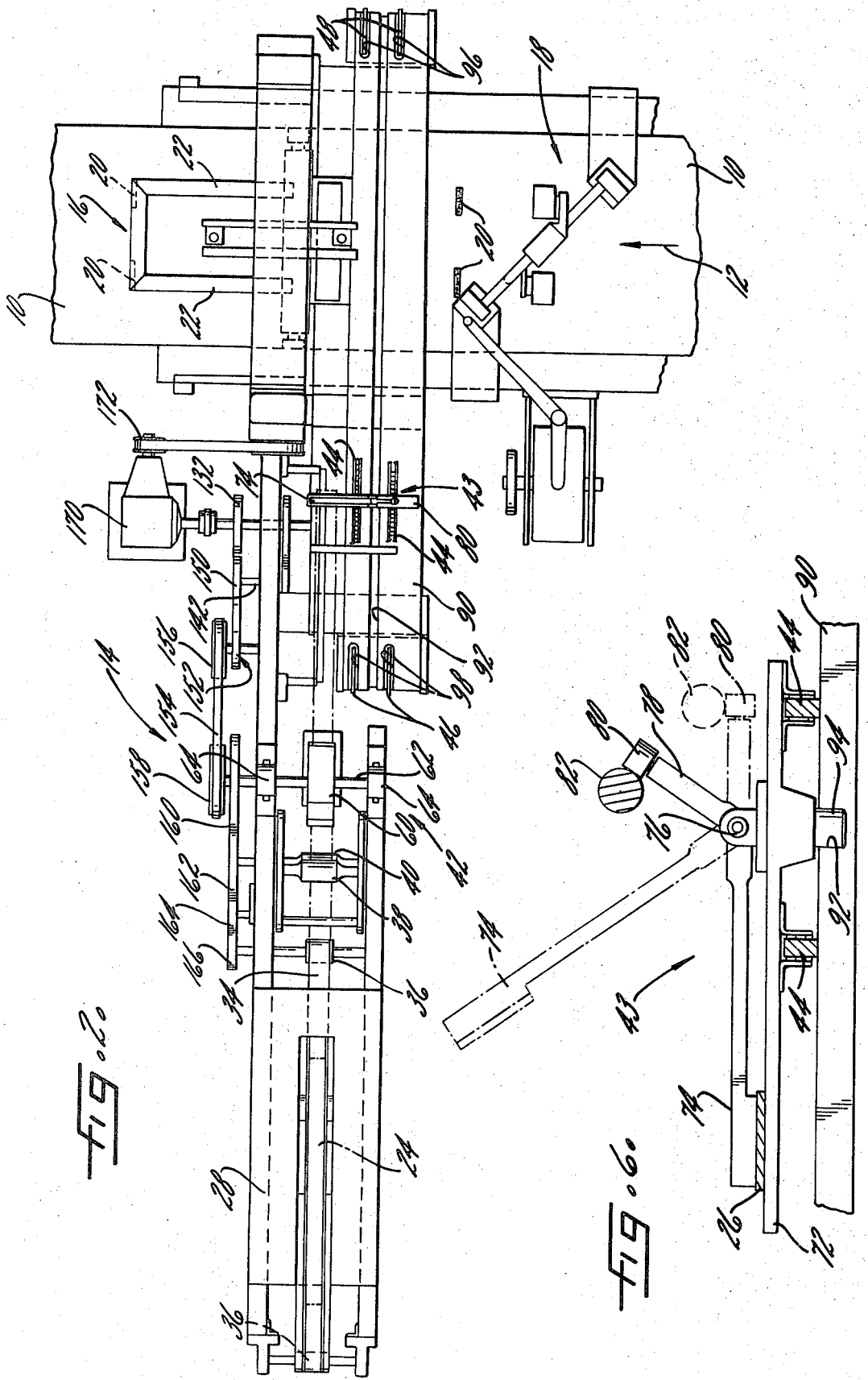

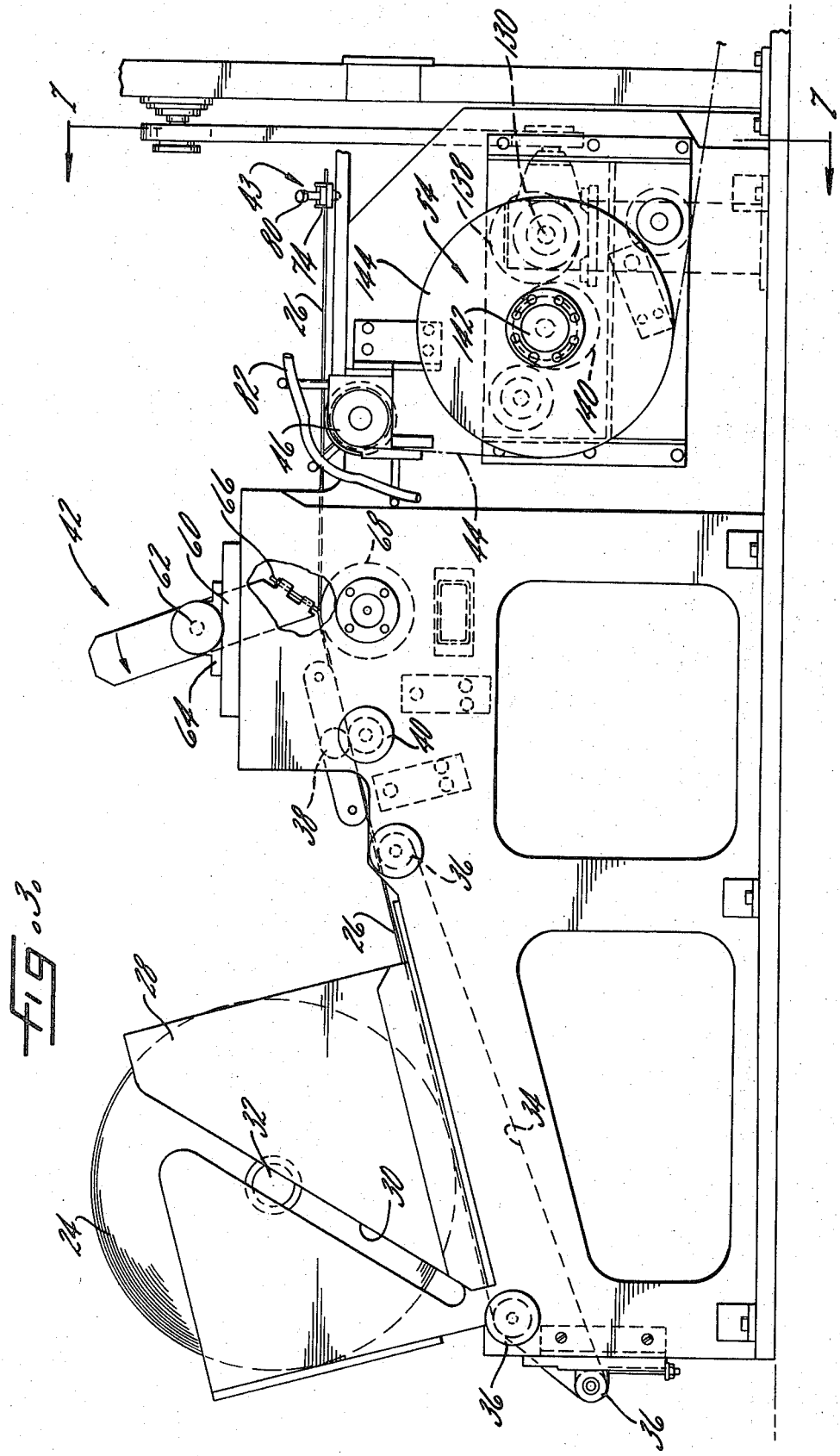

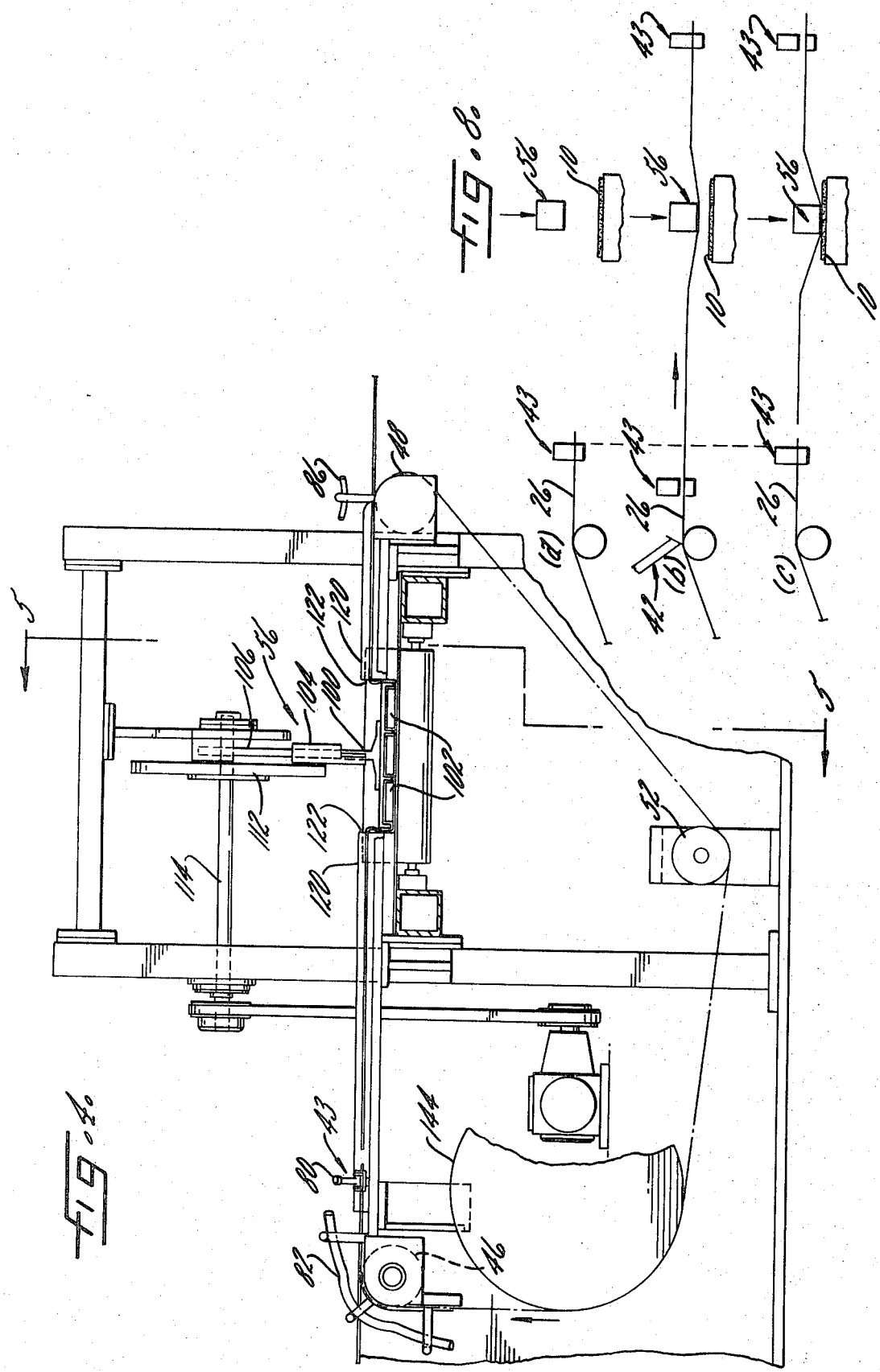

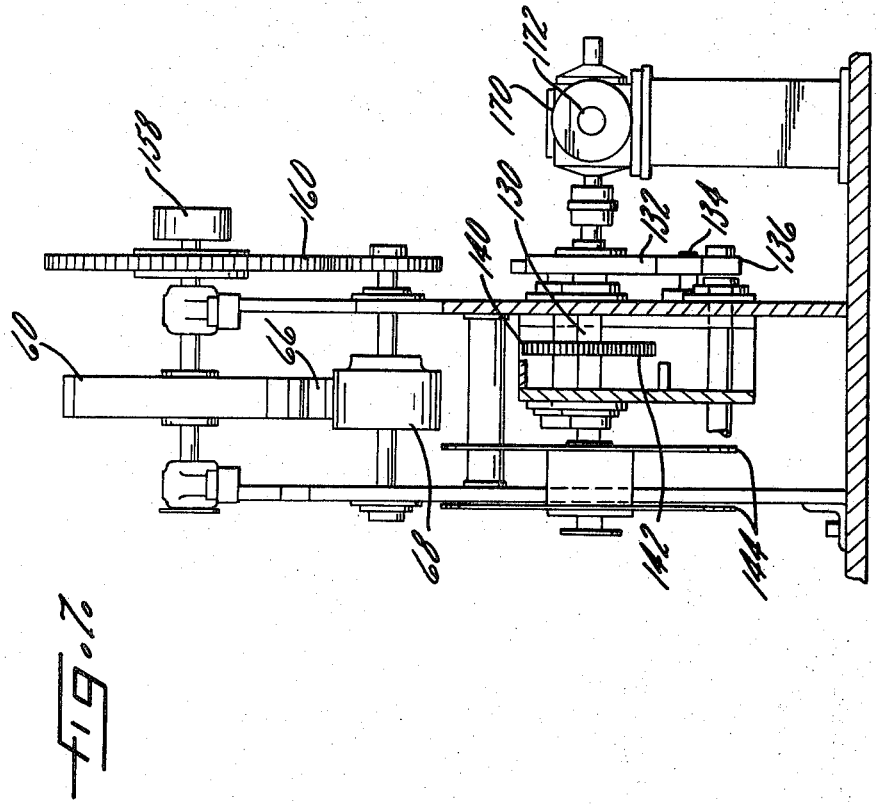
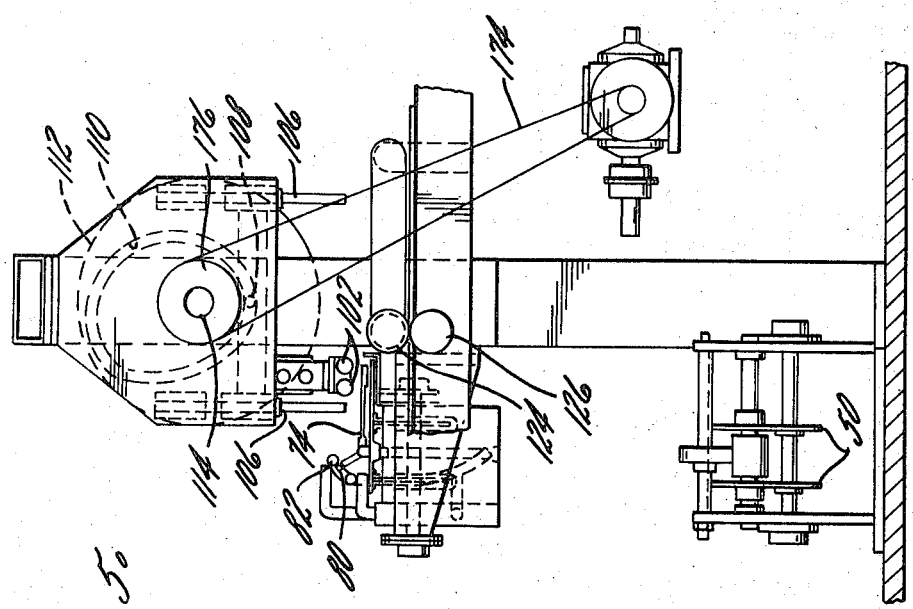

3,837,975
APPARATUS AND METHOD FOR FEEDING AND PLACING ELONGATED FLEXIBLE STRIP MATERIAL
Ronald P. Mandich, Green Bay, and David L. Middleton, Neenah, Wis., assignors to Kimberly-Clark Corporation, Neenah, Wis.
Filed Feb. 22, 1972, Ser. No. 228,047
Int. Cl. B32b 31/00; B65c 11/04
U.S. Cl. 156—513          6 Claims

ABSTRACT OF THE DISCLOSURE

Apparatus for feeding and placing elongated flexible strip material on a generally transversely moving base sheet is disclosed. The apparatus transversely feeds elongated strip material, such as a thin, flexible belt for a surgical gown or the like, across the line of travel of the base sheet to which it is to be applied, separates the material into predetermined blanks and applies the length of the material to the base sheet. Since the length of the material may exceed the repeat length of the base sheet to which it is applied, provision is made for varying the speed of feeding to prevent interference with the trailing edges of the previously applied length of material.

---

This invention generally relates to garment production and, more specifically, related to a method and apparatus for applying elongated strip material, such as thin, flexible belts and the like, to moving base sheet or garments during fabrication of such garments.

While the present invention is particularly well suited for placing and attaching elongated flexible strips of material to a base sheet or component during continuous production of garments and the like, it may be easily adapted for other non-garment related applications, wherever it is desired to feed and apply an elongated component to a transversely continuously moving article of manufacture. While the strips of material may be manually applied by workers in a production line, such manual application of elongated components necessarily includes the usual problems of quality control, limited production speed and other numerous labor difficulties that are occasioned by manual steps during production.

Accordingly, it is a primary object of the present invention to provide a method and apparatus for applying elongated, flexible strip material to an article of manufacture in a consistent, reliable manner in terms of quality control of the resulting product, while substantially reducing the amount of operator time and expense and therefore reducing the element of human error and inconsistency.

Another object of the present invention is to provide a method and apparatus for feeding and placing such elongated flexible strips of material at production line speeds that are not consistently attainable by manual operation.

Another object of the present invention is to provide a method and apparatus that transversely feeds strip material across the line of travel of a continuously moving base sheet and thereafter applies the material at precise locations successively spaced apart from one another in the direction of the base sheet movement. A related object is to provide apparatus for varying the speed of feeding of said strips of material so as to prevent interference with previously applied strips in the event the length of the strips exceed the spacing between the successive locations to which the strips are applied on the base sheet.

Still another object of the present invention is to provide apparatus adapted to use a continuous supply of elongated strip material which is thereafter separated into discrete predetermined lengths for application to the base sheet.

Yet another object is to provide apparatus which is synchronized with the movement of the base sheet so that a great variety of production speeds are attainable without requiring independent control of the apparatus of the present invention.

Still another object of the present invention is to provide apparatus that provides positive control of the flexible elongated strips of material at all times prior to being positively attached to the base sheet.

Other objects and advantages of the present invention will become apparent from reading the ensuing specification, while referring to the drawings, in which:

FIG. 1 is a side elevation of the overall apparatus of the present invention, shown with a minimum of detail;
FIG. 2 is a top plan view of the apparatus of the present invention as well as an adhesive applying mechanism of a garment production line;
FIG. 3 is an enlarged and more detailed side elevation of a portion of the apparatus of FIG. 1;
FIG. 4 is an enlarged and more detailed side elevation of another portion of the apparatus illustrated in FIG. 1;
FIG. 5 is a sectional view of the apparatus shown in FIG. 4, and is taken along the line 5—5 of FIG. 4;
FIG. 6 is an enlarged view of a portion of the apparatus shown in FIG. 5, particularly illustrating the clamping mechanism of the apparatus;
FIG. 7 is a sectional view of the apparatus shown in FIG. 3, and is generally taken along the line 7—7 of FIG. 3; and,
FIG. 8 is a schematic illustration of the operation of a portion of the apparatus of the present invention.

While the invention will be described in connection with certain preferred embodiments, it will be understood that it is not intended to limit the invention to these particular embodiments. On the contrary, it is intended to cover all alternatives, modifications, and equivalents as may be included within the spirit and scope of the invention as expressed in the appended claims.

Turning now to the drawings, and particularly FIGS. 1 and 2, strips of elongated, flexible material of predetermined length are applied to a transversely moving base sheet at successive predetermined locations as the base sheet passes by. Although the method and apparatus of this invention is adapted for many uses where it is desired to apply an elongated length of strip material to a transversely moving base sheet or web, this invention is particularly suited to feeding and applying a thin flexible belt or the like to successive nonwoven disposable gowns, smocks or aprons or the like which are being fabricated on a production line. Referring specifically to FIG. 2, a base sheet 10 is shown moving in the direction of the arrow 12 and the base sheet may represent a series of gowns, which may or may not be cut or otherwise separated from one another at the time the belt or the like is attached thereto. The apparatus of the present invention, indicated generally at 14, transversely feeds and applies a belt 16 to the base material. An adhesive applicator, indicated generally at 18, deposits a pair of spaced-apart adhesive strips 20 that are effective to bond the belt 16 to the base web 10 at the locations as shown. The adhesive strips 20 shown in FIG. 2 are adjacent the waist line of the garment being produced, and the longitudinal distance between the two illustrated pairs of adhesive strips is herein defined as the repeat length of the base sheet. Thus, it should be understood that between the two successive pairs of adhesive applications 20, the growns will be separated by a transverse cut line, although such cutting may either be before or after the application of the belt 16. Since the free ends 22 of the belt 16 may easily exceed the width of the base sheet 10, it is preferable that the free ends 22 be placed in a trailing position as shown so that they will not be caught or damaged as the base sheet 10 moves downstream in the production sequence. Additionally, placement of the free ends in a trailing position may prevent the ends from being caught in side seams or interfering with other operations occurring during subsequent steps of the production.

Referring to the apparatus 14 of the present invention illustrated without substantial detail in FIG. 1, a brief and general description of the apparatus will be given. A supply roll 24 of flexible elongated material 26 is placed in a suitable container 28 having a pair of slots 30 adapted to receive a core 32 of the supply roll. During operation of the apparatus 14 it should be understood as the roll 24 is depleted, the core 32 will slide downwardly in the slot so that the material 26 remains in contact with a drive belt or conveyor 34 that advances in a clockwise direction around three rollers 36. The material 26 is unwound from the roll 24 by the conveyor 34 and is advanced by a backup pull roller 38 cooperating with a driven pull roller 40 which is located beneath the elongated material 26. The backup roller 38 is rotatably mounted on a pivotable arm 41 so that the roller 38 may be lifted out of contact with the roller 40 if desired.

The pull rollers 38, 40 thus advance the material 26 to a perforating station indicated generally at 42 which is operable to at least partially sever the material into predetermined lengths. The perforated material 26 is thereafter clamped by a clamping mechanism 43 (FIGS. 2 and 6) associated with a pair of endless chains 44 or a generally flat belt or the like which travel around sprockets 46, 48, 50, 52 and a drive mechanism indicated generally at 54. The movable clamping mechanism is driven to advance the clamped free leading end of material across the top of the line of travel of the base sheet 10 where a depositor mechanism, indicated generally at 56, is moved downwardly to press an intermediate portion of the material where it overlies the base sheet into contact with the adhesive strips 20 previously applied to the base sheet and thereby attach the length of base material 26. It will be seen that the strip material is clamped during the feeding operation at the foward end and remains attached to the supply roll, so that it is positively held during this operation. When the depositor mechanism moves downward, the material is stretched causing the length of material to break free from the supply roll at the perforated line produced by the perforating station 42. Coincidentally with the operation of the depositor mechanism to bring the length of material into contact with the base sheet 10, the clamping mechanism 43 is unclamped and releases the end that had passed across the base sheet so that the full length of material, now the belt 16 shown in FIG. 2, is free to advance with the base sheet 10 to which it has been applied.

To illustrate the interaction of the various elements of the apparatus, and referring to the schematic illustration of FIG. 8, the clamping mechanism 43 clamps the leading end of the material 43 and advances it transversely toward the base sheet 10 as shown in FIG. 8a. As the material continues its transverse movement relative to the base sheet, it is perforated at the perforating station 42. As the material nears completion of its transverse movement, the deposition mechanism 56 begins to move downwardly to slightly bend the material and place it under slight tension as shown in FIG. 8b. Another clamping mechanism 43 has advanced into position to clamp the material upstream of the perforated line. Shortly thereafter, the depositor mechanism 56 presses the material against the base sheet with the tension placed on the material being sufficient to break the material at the perforated line. During the downward travel of the depositor mechanism, the right or downstream clamping mechanism continues to hold the material, but immediately after the breaking of the material, as shown in FIG. 8c, this clamping mechanism releases the material to allow the material to advance with the base sheet to which it has been applied.

The upstream material 26 continues to advance similar to that described in FIG. 8a while the applied material is carried away by the base sheet.

To perforate the flexible material 26, and referring to FIGS. 2 and 3, the perforating station 42 has a preferably balanced arm 60 secured to a rotatable shaft 62 anchored in suitable bearing blocks 64. At one outer end of the arm 60 is a perforating blade 66 which is adjustably secured to the arm 60 by means well known in the art. Thus, while the shaft 62 is rotatable around a fixed point and the radius of the arm 60 is constant, the angularly oriented perforating blade 66 may be adjusted to increase or decrease its effective radius relative to the fixed shaft 62 and thereby increase or decrease the perforating pressure placed upon the strip material upon which it acts. A preferably hardened steel backup roller 68 is positioned beneath the strip material 26 in cooperative relation with the perforating blades 66. The arm 60 perforates the material 26 during each complete revolution in the counterclockwise direction as shown in FIGS. 1 and 3 and is appropriately driven so that it makes perforations on the material 26 at intervals corresponding to the desired length of the material that will subsequently be applied to the base sheet 10.

One of the features of this invention, briefly mentioned previously, is the feeding and placing of the strip 26 of flexible material under positive control, to overcome the problems which have been found to exist in high speed feeding of such material. Thus, referring to FIGS. 1, 2 and 4–6, the perforated material 26 is fed across the path of the base web 10 by the clamping mechanism 43 best shown in FIG. 6. The clamping mechanism is preferably associated with a pair of endless chains 44, such as double pitch roller chains well known in the art. The roller chains 44 are driven by the drive mechanism 54 in spaced-apart parallel relation around the sprockets 46–52 which are preferably appropriately toothed sprockets. At suitable intervals along their length, for example every 16 inches, stabilizing spacer bars preferably connect the chains. Additionally, a suitable number of clamping mechanisms 43 are inserted in lieu of the spacer bars at regular intervals, with the number of clamping mechanisms 43 being dependent upon the length of the endless path of the chains 44 as well as the length of the flexible material 26 between the perforations. With the apparatus illustrated in the drawings, three such clamping mechanisms are used. It is desired that the clamping mechanisms clamp the material at a small distance behind each of the perforations as the material reaches the upper horizontal portion of the travel of the chains 44 as the material moves toward the base web 10. In this connection, the clamping mechanisms preferably clamp the material approximately one inch behind the perforation so that when the material is severed at the perforated line, the clamp will continue to convey the forward end of the material 26 toward the base sheet under positive control.

To clamp the material, the clamping mechanism is designed to operate in accordance with the principle of a cam follower, with a flat fixed arm 72 suitably fixed to each of the chains and a movable arm 74 pivotable about a pin 76 suitably secured to the fixed arm 72. The opposite end 78 of the movable arm 74 has a friction and wear reducing roller bearing 80 adapted to contact a cam surface 82. The movable arm 74 is biased by a spring or the like (not shown), so that it is normally in a closed position as shown in solid lines of FIG. 6, but which may be moved to an open position by the cam surface as is also shown in phantom. Referring to FIG. 4 in particular, the cam surface 82 is suitably curved such that the movable arm is moved from its normally closed position as it travels with the chain 44 upwardly toward the flexible material 26 and is opened by the interaction of the bearing 80 at the end 78 to the position shown in phantom so that the clamping end of the arm 74 will not interfere with the material 26 until after the clamping mechanism 70 has passed around the sprocket 46. At this point, the cam 82 permits the movable arm 74 to close on the fixed arm 72 and clamp the material 26 therebetween to hold the material during its travel across the base sheet 10 to which it will subsequently be applied.

To release the clamping mechanism 70 when the material 26 is brought into contact with the adhesive strips 20 of the base sheet 10, a second cam surface 86 (FIG. 4) is positioned at a proper location, shown to be between the sprockets 48 and 50 and adjacent the roller 48. The exact location of the cam surface 86, of course, is dependent upon the length of the material 26 between the perforations. An important consideration is that the material should be released from the clamping mechanism when the material is brought into contact with the base sheet 10 so that the material will not be unduly tensioned or broken by the depositer mechanism forcing the material 26 downwardly toward the base sheet. In this connection, the interaction of the cam surface 86 and the movable arm 74 is substantially similar to the operation described with respect to the cam surface 82, except that the clamping end of the movable arm 74 is only required to move away from the fixed arm 72 a sufficient distance so that the end of the material 26 can be released. The cam surface 86 then allows the movable arm to move back to its normally closed position so that it is carried by the chain 44 around the endless path to again clamp the material 26.

To provide generally smooth, vibration free movement of the clamping mechanism and chains 44 during the upper horizontal portion of movement around the endless path, a flat guide plate 90 having a channel or recess 92 therein is provided and a rotatable bearing 94 on the lower side of the fixed arms 72 cooperates with the channel 92 as is most clearly shown in FIG. 6. Recesses 96 and 98 are provided at the outer end portions thereof so that the sprockets 46 and 48 may engage the chains 44.

In accordance with another aspect of the present invention, the depressor mechanism 56 is adapted to force the material downwardly into contact with the adhesive strips applied to the base sheet 10. Referring to FIGS. 1, 4 and 5, the mechanism 56 has a carriage 100 to which a number of rollers 102 are attached. The rollers are adapted to force the material 26 into contact with the adhesive strips 20 of the base web during movement of the base web and, when the contact is made, the rollers wil rotate enabling the material to advance with the base sheet 10. The carriage 100 has two slidable bearings 104 that are vertically movable along a pair of vertical guide bars 106. The carriage also has a rotatable roller bearing 108 that engages a cam track 110 in a large wheel 112 fixed to a shaft 114. Thus, rotation of the shaft 114 and wheel 112 is effective to vertically move the carriage up and down in accordance with the interaction of the roller bearing 108 and the cam track 110 within the wheel 114. The cam track 110 is designed so that the elevation of the carriage and rollers 102 enables the carriage to bring the material 26 into contact with the base sheet 10 at the proper time and then be raised vertically until another segment of the material 26 is in position to be forced into contact with the base sheet.

With respect to the operation of the depositor mechanism vis-a-vis the perforated material 26, the carriage preferably has a vertical travel of about four inches. The bottom of the rollers 102 are vertically spaced-apart about two inches from the material to enable the clamping mechanism to pass under the rollers. After the rollers contact the material, the carriage and rollers travel downwardly about two additional inches before the material contacts the base sheet. Thus, when the rollers 102 initially contact the material 26 and begin to force the material downwardly toward the base sheet 10, tension is placed on the material with the result that the material is severed at the perforated line. As the material is brought into contact with the adhesive strips 20, the clamping mechanism 70 is opened by the cam surface 86 so that both of the free ends of the material 26, shown as the belt 16 in FIG. 2, are free to move with the base sheet 10 away from the apparatus 14 of the present invention. To provide good contact between the applied belt and the adhesive strips 20, the belt and base sheet pass through a nip formed by rollers 124 and 126 located downstream of the depositor mechanism 56 in the direction of the sheet movement. The nip also helps pull the free ends from the apparatus and thereby prevents undue strain on the adhesive bond, since the adhesive may not, as yet be dried or cured.

To insure that the outer ends 22 of the applied belt 16 are placed in the trailing configuration as shown in FIG. 2, a pair of vertical flanges 120 are positioned on opposite sides of the depressor mechanism 56 so that as the belt advances with the base sheet 10, the free ends 22 will be guided around the ends 122 of the flanges 120 and are reoriented to lie on the base sheet 10 in their desired configuration.

In keeping with the present invention, it should be understood that if the average speed of feeding the belt (i.e., the length of material 26 between the successive perforations) is greater than the speed of the base web to which the belt is applied, the base sheet 10 will not carry the trailing free ends 22 away from the apparatus at a sufficient speed to preclude interference from the next advancing belt or length of material that is fed into position. For example, the present invention is adapted to apply a belt having a total length of 64 inches to each of successive gowns wherein the distance between successive adhesive strips is 48 inches. By having an approximate distance of 11 inches between the outside of the adhesive strips 20, the trailing ends 22 will each be about 21½ inches long. Thus, for a distance of approximately 23 to 24 inches, the applied belt will be carried past the ends 122 of the flanges 120 at the speed of movement of the base sheet. Keeping in mind that another 64 inch long length of material must be positioned to be applied to the next succeeding set of adhesive strips 20 during the time required for 48 inches of movement of the base sheet, it should be understood that interference will occur unless the feeding speed of the belts are varied. In keeping with the present example, it is seen that the average speed of feeding must be such that 64 inches of belt are fed and positioned to be applied to the base sheet 10 within 48 inches of movement of the base sheet or, in other words, the average feeding speed must be approximately 1½ times the speed of the advancing base sheet.

To vary the speed of feeding the flexible material or belt, the apparatus of the present invention is provided with a drive mechanism 54 which includes a pair of elliptical gears 134, 136. Referring to FIGS. 3 and 7, an input shaft 130 has a drive gear 132 that is driven through the gears 134 and 136, with the gear 136 being connected to the drive mechanism (not shown) of the remainder of the production line machinery, including the drive for the base sheet 10 conveyor and is therefore synchronized with the speed of the base sheet. An elliptic gear 138 in the drive mechanism is meshed with a second elliptic gear 140 on an output shaft 142 of the drive mechanism to define an elliptical gear arrangement. A larger pair of sprockets 144 are also fixed to the output shaft 142 of the drive mechanism 54 and the sprockets 144 engage the roller chains 44 carrying the clamping mechanims. The ellipitical gear drive thus varies the feeding speed of the flexible material 26 or belt in a manner whereby the belt is initially fed at a lower speed until the trailing ends 22 of the previously applied belt 16 are carried away and the drive mechanism thereafter speeds up so that the succeeding belt may be brought into its proper position in time to be applied to the next succeeding adhesive strips 20 on the advancing base sheet 10.

Since the material 26 is continuous from the supply roll 24 until it is severed by the action of the depositor mechanism 56, it should be understood that varying the speed of the chain 44 and clamping mechanisms 43 requires substantially similar speed variations in the movement of the flexible material 26 as it moves from the supply roll 24. Accordingly, the perforating station 42 and drive rolls 36 and 40 are driven from the output shaft 142 of the elliptical gear drive mechanism 54. Referring to FIG. 2, a gear 150 fixed to the output shaft 142 meshes with gear 152 that drives the rotatable shaft 62 at the perforating station by means of a timing belt 154 connecting pulleys 156 and 158. The rollers 36 and 40 are also driven through the gears 160, 162, 164 and 166 in a conventional manner as is clearly illustrated. Thus, it is seen that the feeding speed of the material 26 is varied in accordance with the angular velocity of the output of the elliptical gear drive mechanism 54.

In keeping with the invention, and referring to FIGS. 4 and 5, the drive for the depositor mechanism preferably has a constant input speed that is only dependent upon the speed and movement of the base web. Since the carriage should come into contact with the belt when it is in the proper position and due to the fact that it has its own cam follower arrangement as has been previously described, the drive for the depositor mechanism is obtained from the input shaft 130. A right angle gear drive unit 170 having a pulley 172 is connected to a timing belt 174 which drives another pulley 176 that is attached to the shaft 116. Thus the input drive to the depositor mechanism is at a generally constant speed synchronized with the speed of the moving web or base sheet 10.

It should be realized from the foregoing description that the apparatus of the present invention represents a unique and useful advance in the art. The apparatus is adapated to operate over a wide variety of production speeds with superior quality control concerning the application of elongated strips of flexible material to a continuously moving web or base sheet. The desirable feature of positively controlling the material being applied at all times is particularly advantageous in that very light weight nonwoven materials may be used during relatively fast production speeds, without the often accompanying windage problem and other control problems.

We claim as our invention:

1. Apparatus for feeding and placing flexible elongated strips of material of predetermined length at successive locations along a base sheet advancing along a path, comprising, in combination:
    means for supplying a continuous strip of said material transverse to said path,
    means downstream of said supply means for partially severing said material at predetermined lengths,
    means downstream of said partial severing means for clamping the leading end of said strip of material,
    means for moving said clamping means while the strip of material is clamped transverse; across the path, with the strip of material out of contact with the base sheet,
    and means intermediate said clamping means and said partial severing means for forcing a portion of said strip of material into contact with said base sheet and for simultaneously causing said predetermined length of said material to break away from said continuous strip.

2. Apparatus as defined in claim 1 wherein said clamping means is mounted on at least one endless chain transversely encircling said path, and means are provided for releasing said predetermined length of said material from said clamping means after said length of material has broken away from said continuous strip.

3. Apparatus as defined in claim 1 wherein said clamping means includes:
    at least one fixed arm attached to said chain and providing a support for said leading end of said strip of material,
    a pivotable arm operably connected to said fixed arm and normally biased such that the outer end portion thereof is closed upon said fixed arm to thereby clamp said leading end, said movable arm having an associated cam follower,
    a first stationary cam surface adapted to cooperate with said cam follower to open said pivotable arm enabling said leading end to be fed thereto and thereafter close and clamp said leading end during movement of said chain around said path, and
    a second stationary cam surface adapted to open said pivotable arm to thereby release said leading end during subsequent movement of said chain around said path.

4. Apparatus as defined in claim 1 including means for regularly varying the speed of operation of said clamping means whereby each of said strips of predetermined length is initially fed at a lower speed to permit the preceding strip to advance without interference.

5. Apparatus as defined in claim 1 wherein said means for partially severing said material includes a perforator.

6. Apparatus as defined in claim 1 including means along said path upstream of said forcing means for applying adhesive at predetermined locations on said base sheet.

References Cited

UNITED STATES PATENTS

| | | | |
|---|---|---|---|
| 1,861,144 | 5/1932 | Schmiedel | 156—521 |
| 2,654,495 | 10/1953 | Meyer | 156—521 |
| 2,988,129 | 6/1961 | Kevelin et al. | 156—522 |
| 2,601,005 | 6/1952 | Raney | 156—522 |

DOUGLAS J. DRUMMOND, Primary Examiner

U.S. Cl. X.R.

156—519, 522, 578